United States Patent
Song et al.

(10) Patent No.: US 11,745,304 B2
(45) Date of Patent: Sep. 5, 2023

(54) DIAMOND SPECIAL-SHAPED GRINDING WHEEL AND VERTICAL MACHINING COOLING SYSTEM

(71) Applicant: GUILIN CHAMPION UNION DIAMOND Co., Ltd., Guangxi (CN)

(72) Inventors: Jingxin Song, Guangxi (CN); Yuanpei Cai, Guangxi (CN); Xinling Guo, Guangxi (CN)

(73) Assignee: GUILIN CHAMPION UNION DIAMOND Co., Ltd., Guangxi (CN)

( * ) Notice: Subject to any disclaimer, the term of this patent is extended or adjusted under 35 U.S.C. 154(b) by 1013 days.

(21) Appl. No.: 16/494,755

(22) PCT Filed: Mar. 21, 2018

(86) PCT No.: PCT/CN2018/079840
§ 371 (c)(1),
(2) Date: Sep. 16, 2019

(87) PCT Pub. No.: WO2018/166539
PCT Pub. Date: Sep. 20, 2018

(65) Prior Publication Data
US 2020/0101578 A1    Apr. 2, 2020

(30) Foreign Application Priority Data

Mar. 17, 2017   (CN) .......................... 201710160360.1
Mar. 17, 2017   (CN) .......................... 201720262374.X
(Continued)

(51) Int. Cl.
*B24B 41/00*    (2006.01)
*B24B 55/03*    (2006.01)
(Continued)

(52) U.S. Cl.
CPC ............ *B24B 41/002* (2013.01); *B24B 55/03* (2013.01); *B24D 5/10* (2013.01); *B24D 7/10* (2013.01)

(58) Field of Classification Search
CPC ........... B24D 5/10; B24B 55/02; B24B 55/03; B24B 55/045; B24B 55/12; B24B 57/02
(Continued)

(56) References Cited

U.S. PATENT DOCUMENTS

2010/0285729 A1   11/2010   Loveless
2014/0329448 A1*  11/2014   Song ........................ B24D 5/10
                                                   451/488

FOREIGN PATENT DOCUMENTS

CN    102126259 A    7/2011
CN    103302600 A    9/2013
(Continued)

*Primary Examiner* — Joel D Crandall
*Assistant Examiner* — Aaron R McConnell
(74) *Attorney, Agent, or Firm* — Craft Chu PLLC; Andrew W. Chu

(57)    ABSTRACT

A diamond special-shaped grinding wheel includes an upper base body, a lower base body, and a grinding ring. The upper base body is disposed at the upper end of the lower base body, and the upper base body and the lower base body are fixedly connected to form a grinding wheel body. The grinding ring is fixed to an outer ring of the grinding wheel body; the grinding wheel body is internally provided with one or two annular grooves communicated with the upper end face of the grinding wheel body. A plurality of mixed flow channels is formed in the grinding ring. One end of each mixed flow channel extends to an annular grinding opening of the grinding ring, the other end is communicated with one annular groove, and the annular grooves are
(Continued)

communicated with an external negative pressure air source device. Also disclosed is a vertical machining cooling system.

11 Claims, 11 Drawing Sheets

(30) Foreign Application Priority Data

Mar. 21, 2017 (CN) .......................... 201710169866.9
Mar. 21, 2017 (CN) .......................... 201720277016.6

(51) Int. Cl.
  *B24D 5/10* (2006.01)
  *B24D 7/10* (2006.01)

(58) Field of Classification Search
  USPC .......................... 451/388, 449, 450, 456, 488
  See application file for complete search history.

(56) References Cited

FOREIGN PATENT DOCUMENTS

| | | |
|---|---|---|
| CN | 203650256 U | 6/2014 |
| CN | 104772694 A | 7/2015 |
| CN | 106625107 A | 5/2017 |
| CN | 106903567 A | 6/2017 |
| CN | 206732729 U | 12/2017 |
| EP | 1199135 A1 | 4/2002 |
| JP | H02274461 A | 11/1990 |
| SE | 315121 B | 9/1969 |

\* cited by examiner

DIAMOND SPECIAL-SHAPED GRINDING WHEEL AND VERTICAL MACHINING COOLING SYSTEM

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the technical field of glass machining, and more particularly, relates to a diamond special-shaped grinding wheel for machining a special-shaped glass, and a vertical machining cooling system.

2. Description of Related Art Including Information Disclosed Under 37 CFR 1.97 and 37 CFR 1.98

Special-shaped edges (i.e., the edges of glass are special-shaped) of a special-shaped glass (i.e., the overall shape of the glass is special-shaped) are generally machined in a glass machining center. The glass is fixed on a workbench. A diamond special-shaped grinding wheel is driven by a main shaft to move around the glass, and the outer edge or the inner edge of the glass is subjected to edge grinding.

When the diamond special-shaped grinding wheel performs the edge grinding, cooling water is required.

A vertical machining center is generally equipped with a cooling water source in an external cooling mode, which is sprayed to a grinding area through an external water flow channel to cool the glass and the grinding wheel. A water supply unit in the external cooling mode is generally arranged above the end surface of the glass to implement one-sided water supply. It cannot be ensured whether the grinding area which is located at one side of the lower end surface of the glass can be reached by cooling water. In the external cooling mode, the cooling water acting on a working face of the grinding wheel is always in a tendency to be thrown away from the working face of the grinding wheel, such that the utilization rate of the cooling water is very low. In the external cooling mode, most of the cooling water does not act on the grinding area, resulting in waste.

Some vertical machining centers are also equipped with a cooling water source in an internal cooling mode, which injects cooling water to a grinding area through a water flow channel arranged in a main shaft via water passing holes of a grinding wheel, to cool the glass and the grinding wheel. However, the water passing holes are limited in number and sparsely distributed over the entire circumference, and thus cannot continuously and effectively act on the entire circumferential grinding surface of the grinding wheel. Therefore, the cooling is only intermittent, and is thus difficult to adapt to high-speed and efficient machining of the grinding wheel.

A composite mode of the external cooling mode and the internal cooling mode is also a commonly used method, but it cannot remove the above defects.

In the above cooling modes, when the grinding wheel operates, powder and cooling water are thrown away from the grinding surface of the grinding wheel, resulting in a relatively large range of environmental pollution formed on a machining site. In order to alleviate this problem, a closed cover is generally used now to limit the pollution within a certain area, which facilitates the collection of powder and the recovery of cooling water.

With the improvement of machining efficiency and low-cost machining requirements, it is necessary to develop glass machining automation (connected). However, the existence of the closed cover complicates the glass machining automation (connected). Special automated machinery is required for loading and unloading, which increases the cost and affects the efficiency of automated (connected) production.

BRIEF SUMMARY OF THE INVENTION

An objective of the present invention is to provide a diamond special-shaped grinding wheel and a vertical machining cooling system. The technical problems to be solved are that: most of cooling water does not act on a grinding area, resulting in waste; the cooling is only intermittent, and is thus difficult to adapt to high-speed and efficient machining of the grinding wheel; the cost is high and the production efficiency is low.

The technical solution of the present invention that solves the above technical problems is as follows: a diamond special-shaped grinding wheel comprises an upper base body, a lower base body, and a grinding ring, wherein the upper base body is arranged at an upper end of the lower base body, and the upper base body and the lower base body are fixedly connected to form a grinding wheel body; the grinding ring in an annular shape is fixed to an outer circular ring of the grinding wheel body; the grinding wheel body is internally provided with one or two annular grooves communicated with an upper end face of the grinding wheel body; a plurality of mixed flow channels through which cooling water, powder and air are sucked is formed in the grinding ring; one end of each of the mixed flow channels extends to an annular grinding opening of the grinding ring, and the other end of each of the mixed flow channels is communicated with one annular groove; and the annular grooves are communicated with an external negative pressure air source device.

The diamond special-shaped grinding wheel of the present invention has the following beneficial effects: the shape of the mixed flow channels in the grinding ring has a larger cross-sectional area and does not result in an easy wear of a broached groove caused by the grinding wheel. Meanwhile, when the diamond special-shaped grinding wheel operates rotatably, cooling water is sucked at the grinding opening of the grinding ring to form a coating water film on the working face of the grinding wheel, such that the cooling effect is improved, and the usage amount of the cooling water is reduced. Cooling water, powder and air are discharged through the mixed flow channels so as to be collected, such that the pollution formed on the machining site is reduced and the cost of sewage treatment is greatly reduced.

Further, the grinding ring is fixed to the outer circular ring of the grinding wheel body by once die-casting with a mold; or the grinding ring is formed by arranging a plurality of tooth blocks at intervals or by connecting the plurality of tooth blocks in sequence to form a circular ring structure, and is fixed to the outer circular ring of the grinding wheel body; the mixed flow channel is formed between every two adjacent tooth blocks.

The further solution adopted herein has the following beneficial effects: the plurality of tooth blocks forms a grinding ring structure, which greatly reduces the machining difficulty and cost of the mixed flow channels of the grinding ring. Meanwhile, the plurality of tooth blocks is arranged at intervals to realize intermittent grinding, which is beneficial to improve the grinding efficiency.

Further, the grinding wheel body is provided with a plurality of water inlet channels to which the cooling water is introduced and which penetrate through an upper end surface and a lower end surface of the grinding wheel body.

A further technical solution of the present invention that solves the above technical problems is as follows: a vertical machining cooling system comprises a rotary main shaft and the diamond special-shaped grinding wheel, wherein the diamond special-shaped grinding wheel sleeves a lower part of the rotary main shaft; a first accessory having a circular ring shape is arranged at an upper end of the diamond special-shaped grinding wheel; the annular groove in the diamond special-shaped grinding wheel is communicated with a negative pressure channel in the first accessory; cooling water is input to an upper side and/or a lower side of the grinding opening of the diamond special-shaped grinding wheel; a negative pressure is formed inside the negative pressure channel; and cooling water, powder and air are sucked through the mixed flow channels.

The vertical machining cooling system of the present invention has the beneficial effects: when the diamond special-shaped grinding wheel operates rotatably, cooling water forms a coating water film on the working face of the grinding wheel under the action of a negative pressure air source, such that the cooling effect is improved, and the usage amount of the cooling water is reduced. The powder is mixed with the cooling water under the action of the negative pressure air source, and the mixture is then transported to the outside through the mixed flow channels and the negative pressure channel for recovery and separation. The rapid removal of the powder from a grinding surface not only reduces the frictional heat, but also ensures the protrusion height of diamond, such that the grinding capability of the grinding wheel can be improved to adapt to efficient machining. Meanwhile, the pollution formed on the machining site is reduced. In addition, the amount of cooling water is reduced, which not only saves water consumption, but also greatly reduces the cost of sewage treatment.

On the basis of the above technical solution, the following improvements may be made in the present invention.

Further, the first accessory wraps an upper part of the diamond special-shaped grinding wheel; a second accessory having a circular ring shape is arranged at a lower end of the diamond special-shaped grinding wheel; the second accessory wraps a lower part of the diamond special-shaped grinding wheel; an annular opening is formed in a position, corresponding to the grinding opening of the diamond special-shaped grinding wheel, of the first accessory and the second accessory, respectively; a first upper water flow channel is arranged between the first accessory and an upper end surface of the diamond special-shaped grinding wheel; one end of the first upper water flow channel is communicated with a first cooling water channel in the rotary main shaft, and the other end of the first upper water flow channel extends downward to the grinding opening of the diamond special-shaped grinding wheel; a first lower water flow channel is arranged between the second accessory and a lower end surface of the diamond special-shaped grinding wheel; one end of the first lower water flow channel extends upward to the grinding opening of the diamond special-shaped grinding wheel, and the other end of the first lower water flow channel is communicated with the first cooling water channel in the rotary main shaft.

The further solution adopted herein has the following beneficial effects: when the diamond special-shaped grinding wheel operates rotatably, the first upper water flow channel and the first lower water flow channel discharge cooling water respectively to the grinding opening of the diamond special-shaped grinding wheel in up and down directions. Cooling water forms a coating water film on the working face of the diamond special-shaped grinding wheel under the action of a negative pressure air source, such that the cooling effect is improved, and the usage amount of the cooling water is reduced. Meanwhile, the pollution formed on the machining site is reduced. In addition, the amount of cooling water is reduced, which not only saves water consumption, but also greatly reduces the cost of sewage treatment.

Further, an annular first cooling water conveying device surrounding the grinding opening is fixedly arranged at the grinding opening of the diamond special-shaped grinding wheel; a water outlet of the annular first cooling water conveying device is positioned above the grinding opening of the diamond special-shaped grinding wheel, and faces the grinding opening of the diamond special-shaped grinding wheel; a third accessory having a circular ring shape is arranged at the lower end of the diamond special-shaped grinding wheel; the third accessory wraps the lower part of the diamond special-shaped grinding wheel; a second lower water flow channel is arranged between the third accessory and the lower end surface of the diamond special-shaped grinding wheel; one end of the second lower water flow channel extends upward to the grinding opening of the diamond special-shaped grinding wheel, and the other end of the second lower water flow channel is communicated with the first cooling water channel in the rotary main shaft.

The further solution adopted herein has the following beneficial effects: when the diamond special-shaped grinding wheel operates rotatably, the annular first cooling water conveying device and the first lower water flow channel discharge cooling water respectively to the grinding opening of the diamond special-shaped grinding wheel in up and down directions. The water outlet of the annular first cooling water conveying device does not rotate with the diamond special-shaped grinding wheel, such that the cooling water is less affected by the centrifugal action of the diamond special-shaped grinding wheel. Cooling water forms a coating water film on the working face of the diamond special-shaped grinding wheel under the action of a negative pressure air source, such that the cooling effect is improved, and the usage amount of the cooling water is reduced. Meanwhile, the pollution formed on the machining site is reduced, and the cost of sewage treatment is greatly reduced.

Further, the first accessory wraps the upper part of the diamond special-shaped grinding wheel; a fourth accessory having a circular ring shape is arranged at the lower end of the diamond special-shaped grinding wheel; the fourth accessory wraps the lower part of the diamond special-shaped grinding wheel; an annular opening is formed in a position, corresponding to the grinding opening of the diamond special-shaped grinding wheel, of the first accessory and the fourth accessory, respectively; a second upper water flow channel is arranged between the first accessory and the upper end surface of the diamond special-shaped grinding wheel; one end of the second upper water flow channel is communicated with a second cooling water channel in the first accessory, and the other end of the second upper water flow channel extends downward to the grinding opening of the diamond special-shaped grinding wheel; a third lower water flow channel is arranged between the fourth accessory and the lower end surface of the diamond special-shaped grinding wheel; one end of the third lower water flow channel extends upward to the grinding opening of the diamond special-shaped grinding wheel, and the other end of the third lower water flow channel is communicated with the second cooling water channel in the first accessory via the water inlet channel.

The further solution adopted herein has the following beneficial effects: when the diamond special-shaped grinding wheel operates rotatably, the second upper water flow channel and the third lower water flow channel discharge cooling water respectively to the grinding opening of the diamond special-shaped grinding wheel in up and down directions. Cooling water forms a coating water film on the working face of the grinding wheel under the action of the negative pressure air source, such that the cooling effect is improved, and the usage amount of the cooling water is reduced. Meanwhile, the pollution formed on the machining site is reduced, and the cost of sewage treatment is greatly reduced.

Further, an annular second cooling water conveying device surrounding the grinding opening is fixedly arranged at the grinding opening of the diamond special-shaped grinding wheel; a water outlet of the annular second cooling water conveying device is positioned above the grinding opening of the diamond special-shaped grinding wheel, and faces the grinding opening of the diamond special-shaped grinding wheel; a fifth accessory having a circular ring shape is arranged at the lower end of the diamond special-shaped grinding wheel; the fifth accessory wraps the lower part of the diamond special-shaped grinding wheel; a fourth lower water flow channel is arranged between the fifth accessory and the lower end surface of the diamond special-shaped grinding wheel; one end of the fourth lower water flow channel extends upward to the grinding opening of the diamond special-shaped grinding wheel, and the other end of the fourth lower water flow channel is communicated with the second cooling water channel in the first accessory via the water inlet channel; and the second cooling water channel in the first accessory is positioned at the outer side of the negative pressure channel.

The further solution adopted herein has the following beneficial effects: when the diamond special-shaped grinding wheel operates rotatably, the annular second cooling water conveying device and the fourth lower water flow channel discharge cooling water respectively to the grinding opening of the diamond special-shaped grinding wheel in up and down directions. The water outlet of the annular second cooling water conveying device does not rotate with the diamond special-shaped grinding wheel, such that the cooling water is less affected by the centrifugal action of the diamond special-shaped grinding wheel. Cooling water forms a coating water film on the working face of the diamond special-shaped grinding wheel under the action of the negative pressure air source, such that the cooling effect is improved, and the usage amount of the cooling water is reduced. Meanwhile, the pollution formed on the machining site is reduced, and the cost of sewage treatment is greatly reduced.

Further, an annular third cooling water conveying device surrounding the grinding opening is fixedly arranged at the grinding opening of the diamond special-shaped grinding wheel; a water outlet of the annular third cooling water conveying device is positioned above the grinding opening of the diamond special-shaped grinding wheel, and faces the grinding opening of the diamond special-shaped grinding wheel; a sixth accessory having a circular ring shape is arranged at the lower end of the diamond special-shaped grinding wheel; the sixth accessory wraps the lower part of the diamond special-shaped grinding wheel; a fifth lower water flow channel is arranged between the sixth accessory and the lower end surface of the diamond special-shaped grinding wheel; one end of the fifth lower water flow channel extends upward to the grinding opening of the diamond special-shaped grinding wheel, and the other end of the fifth lower water flow channel is communicated with the second cooling water channel in the first accessory; and the second cooling water channel in the first accessory is positioned at the inner side of the negative pressure channel.

The further solution adopted herein has the following beneficial effects: when the diamond special-shaped grinding wheel operates rotatably, the annular third cooling water conveying device and the fifth lower water flow channel discharge cooling water respectively to the grinding opening of the diamond special-shaped grinding wheel in up and down directions. The water outlet of the annular third cooling water conveying device does not rotate with the diamond special-shaped grinding wheel, such that the cooling water is less affected by the centrifugal action of the diamond special-shaped grinding wheel. Cooling water forms a coating water film on the working face of the diamond special-shaped grinding wheel under the action of the negative pressure air source, such that the cooling effect is improved, and the usage amount of the cooling water is reduced. Meanwhile, the pollution formed on the machining site is reduced, and the cost of sewage treatment is greatly reduced.

Further, an annular fourth cooling water conveying device surrounding the grinding opening is fixedly arranged at the grinding opening of the diamond special-shaped grinding wheel; a water outlet of the annular fourth cooling water conveying device is positioned above the grinding opening of the diamond special-shaped grinding wheel, and faces the grinding opening of the diamond special-shaped grinding wheel.

The further solution adopted herein has the following beneficial effects: when the diamond special-shaped grinding wheel operates rotatably, the annular fourth cooling water conveying device discharges cooling water to the grinding opening of the diamond special-shaped grinding wheel. The water outlet of the annular fourth cooling water conveying device does not rotate with the diamond special-shaped grinding wheel, such that the cooling water is less affected by the centrifugal action of the diamond special-shaped grinding wheel. Cooling water forms a coating water film on the working face of the grinding wheel under the action of the negative pressure air source, such that the cooling effect is improved, and the usage amount of the cooling water is reduced. Meanwhile, the pollution formed on the machining site is reduced, and the cost of sewage treatment is greatly reduced.

Further, the vertical machining cooling system further comprises a recovery device for recovering cooling water and powder, and a negative pressure air source device, wherein the recovery device is communicated with the negative pressure channel; and the negative pressure air source device is communicated with the recovery device via a pipeline.

The further solution adopted herein has the following beneficial effects: a negative pressure is formed inside the recovery device by means of the negative pressure air source device. The cooling water, powder and air are sucked through the mixed flow channels for separation and recovery, such that the pollution formed on the machining site is reduced, and the amount of cooling water is reduced, which not only saves water consumption, but also greatly reduces the cost of sewage treatment.

In drawings, reference symbols represent the following components as follows:

1—rotary main shaft; 2—diamond special-shaped grinding wheel; 3—first accessory; 4—mixed flow channel; 5—negative pressure channel; 6—second accessory; 7—first upper water flow channel; 8—first lower water flow channel; 9—annular first cooling water conveying device; 10—second lower water flow channel; 11—first cooling water channel; 12—fourth accessory; 13—second upper water flow channel; 14—third lower water flow channel; 15—annular second cooling water conveying device; 16—fifth accessory; 17—fourth lower water flow channel; 18—annular third cooling water conveying device; 19—sixth accessory; 20—fifth lower water flow channel; 21—annular fourth cooling water conveying device; 22—recovery device; 23—glass workpiece; 24—second cooling water channel; 25—third accessory; 201—upper base body; 202—lower base body; 203—grinding ring; 204—annular groove; 205—tooth block; 206—water inlet channel.

DETAILED DESCRIPTION OF THE INVENTION

The principles and features of the present invention are described below with reference to the accompanying drawings. The examples are intended to be illustrate the present invention only, rather than limiting the scope of the present invention.

Embodiment 1

Figure 21:
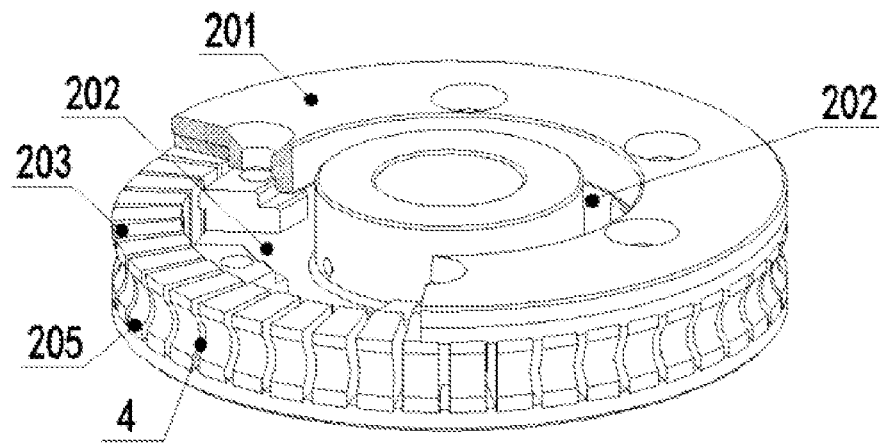
FIG. 21 is a schematic view of a structural diagram in which tooth blocks in the diamond special-shaped grinding wheel are arranged at intervals to form a grinding ring.
Figure 22:
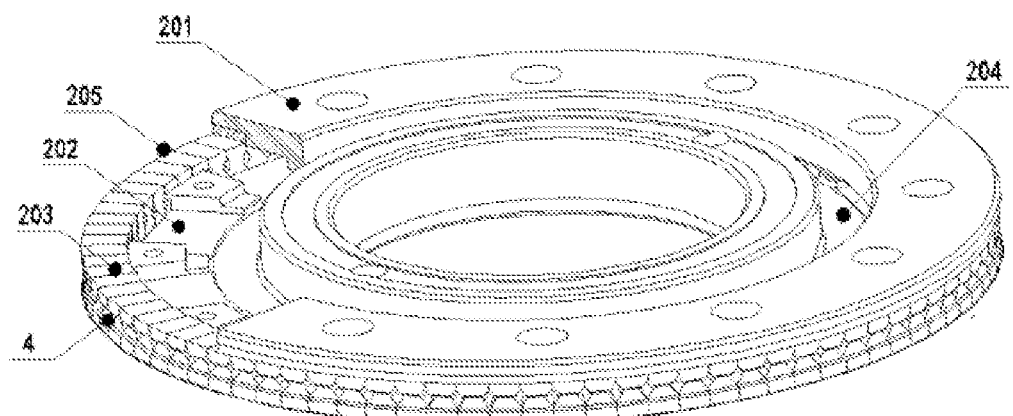
FIG. 22 is a schematic view of a structural diagram in which tooth blocks in the diamond special-shaped grinding wheel are connected in sequence to form a grinding ring.
Figure 23:
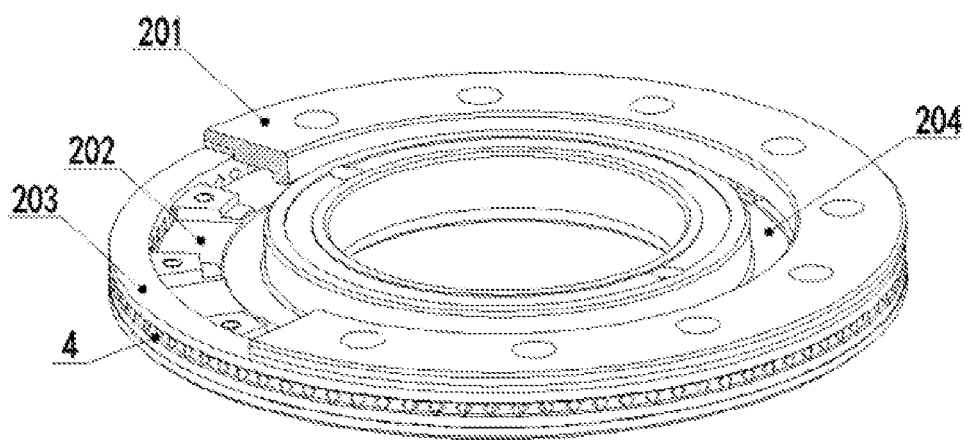
FIG. 23 is a schematic view of a structural diagram showing an overall structure of the grinding ring in the diamond special-shaped grinding wheel.

As shown in FIGS. 21 to 23, a diamond special-shaped grinding wheel comprises an upper base body, a lower base body, and a grinding ring. The upper base body is arranged at the upper end of the lower base body, and the upper base body and the lower base body are fixedly connected to form a grinding wheel body. The grinding ring is annularly fixed to an outer circular ring of the grinding wheel body. The grinding wheel body is internally provided with one or two annular grooves communicated with the upper end face of the grinding wheel body. A plurality of mixed flow channels through which cooling water, powder and air are sucked is formed in the grinding ring. One end of each of the mixed flow channels extends to an annular grinding opening of the grinding ring, and the other end of the mixed flow channel is communicated with one annular groove. The plurality of mixed flow channels is arranged at equal angles. The annular grooves are communicated with an external negative pressure air source device.

The grinding ring 203 has a circular shape. The shape of the mixed flow channels in the grinding ring has a larger cross-sectional area and does not result in an easy wear of a broached groove caused by the grinding wheel. Meanwhile, when the diamond special-shaped grinding wheel operates rotatably, cooling water is sucked at the grinding opening of the grinding ring 203 to form a coating water film on the working face of the grinding wheel, such that the cooling effect is improved, and the usage amount of the cooling water is reduced. Cooling water, powder and air are discharged through the mixed flow channels and the annular grooves so as to be collected, such that the pollution formed on the machining site is reduced. In addition, the cost of sewage treatment is greatly reduced.

In the above embodiment, the grinding ring 203 is fixed to an outer circular ring of the grinding wheel body by once die-casting with a mold. The grinding ring 203 is provided with a plurality of mixed flow channels 4. Alternatively, the grinding ring 203 is formed by arranging the plurality of tooth blocks 205 at intervals or by connecting the plurality of tooth blocks in sequence to form a circular ring structure, and is fixed to the outer circular ring of the grinding wheel body. The mixed flow channel 4 is formed between every two adjacent tooth blocks 205. A tooth block opening is formed at one side of each of the tooth blocks 205 away from the center of the circular ring, and a plurality of tooth block openings forms an annular grinding opening.

The plurality of tooth blocks 205 forms the structure of the grinding ring 203, which greatly reduces the machining difficulty and cost of the mixed flow channels of the grinding ring 203. Meanwhile, the plurality of tooth blocks 205 is arranged at intervals to realize intermittent grinding, which is beneficial to improve the grinding efficiency. The grinding ring 203 is manufactured by a technology of the Chinese patent No. ZL201210013303.8 "Anti-lost Special-shaped Grinding Wheel".

In the above embodiment, the grinding wheel body is provided with a plurality of water inlet channels 206 to which the cooling water is introduced and which penetrate through the upper end surface and the lower end surface of the grinding wheel body.

Embodiment 2

As shown in FIGS. 1 to 4, a vertical machining cooling system comprises a rotary main shaft 1 and a diamond special-shaped grinding wheel 2. The diamond special-shaped grinding wheel 2 sleeves the lower part of the rotary main shaft 1. A first accessory 3 having a circular ring shape is arranged at the upper end of the diamond special-shaped grinding wheel 2. An annular groove 204 in the diamond special-shaped grinding wheel 2 is communicated with a negative pressure channel 5 in the first accessory 3. Cooling water is input to the upper side and/or the lower side of a grinding opening of the diamond special-shaped grinding wheel 2. The grinding opening of the diamond special-shaped grinding wheel 2 refers to a grinding opening of the grinding ring 203. A negative pressure is formed inside the negative pressure channel 5. Cooling water, powder and air are sucked through the mixed flow channels 4.

In the above embodiment, the first accessory 3 wraps the upper part of the diamond special-shaped grinding wheel 2. A second accessory 6 having a circular ring shape is arranged at the lower end of the diamond special-shaped grinding wheel 2. The second accessory 6 wraps the lower part of the diamond special-shaped grinding wheel 2. An annular opening is formed in a position, corresponding to the grinding opening of the diamond special-shaped grinding wheel 2, of the first accessory 3 and the second accessory 6, respectively. A first upper water flow channel 7 is arranged between the first accessory 3 and the upper end surface of the diamond special-shaped grinding wheel 2. One end of the first upper water flow channel 7 is communicated with a first cooling water channel 11 in the rotary main shaft 1, and the other end of the first upper water flow channel 7 extends downward to the grinding opening of the diamond special-shaped grinding wheel 2. A first lower water flow channel 8 is arranged between the second accessory 6 and the lower end surface of the diamond special-shaped grinding wheel 2. One end of the first lower water flow channel 8 extends upward to the grinding opening of the diamond special-shaped grinding wheel 2, and the other end of the first lower water flow channel 8 is communicated with the first cooling water channel 11 in the rotary main shaft 1. A kidney-shaped groove is formed at a position, corresponding to the negative pressure channel 5, of the first accessory 3.

During machining, the rotary main shaft 1 rotates to drive the diamond special-shaped grinding wheel 2 to rotate to grind a glass workpiece 23. A cooling water source in the rotary main shaft 1 outputs cooling water to the first upper water flow channel 7 and the first lower water flow channel 8 via the first cooling water channel 11. The first upper water flow channel 7 and the first lower water flow channel 8 discharge cooling water respectively to the grinding opening of the diamond special-shaped grinding wheel 2 in up and down directions. A negative pressure is formed inside the negative pressure channel 5 under the action of the negative pressure air source. Cooling water output from the first upper water flow channel 7 and the first lower water flow channel 8 forms a coating water film on the working face of the diamond special-shaped grinding wheel 2, such that the cooling effect is improved, and the usage amount of the cooling water is reduced. The powder is mixed with the cooling water under the action of the negative pressure air source, and the mixture is then transported to the outside through the mixed flow channels 4 and the negative pressure channel 5 for recovery and separation. The rapid removal of the powder from the grinding surface not only reduces the frictional heat, but also ensures the protrusion height of diamond, such that the grinding capability of the grinding wheel can be improved to adapt to efficient machining. Meanwhile, the pollution formed on a machining site is reduced. In addition, the amount of cooling water is reduced, which not only saves water consumption, but also greatly reduces the cost of sewage treatment.

During machining, the rotary main shaft 1 rotates at a high speed to drive the diamond special-shaped grinding wheel 2 to rotate at a high speed to grind the glass workpiece 23. Cooling water mist in the rotary main shaft 1 is output to the first upper water flow channel 7 and the first lower water flow channel 8 via the first cooling water channel 11. The first upper water flow channel 7 and the first lower water flow channel 8 discharge cooling water mist respectively to the grinding opening of the diamond special-shaped grinding wheel 2 in up and down directions. A negative pressure is formed inside the negative pressure channel 5 under the action of the negative pressure air source. Cooling water mist output from the first upper water flow channel 7 and the first lower water flow channel 8 forms a coating water film on the working face of the diamond special-shaped grinding wheel 2, such that the cooling effect is improved, and the usage amount of the cooling water mist is reduced.

In the above embodiment, the vertical machining cooling system further comprises a recovery device 22 for recovering cooling water and powder, and a negative pressure air source device. The recovery device 22 is communicated with the negative pressure channel 5. The negative pressure air source device is communicated with the recovery device 22 via a pipeline.

A negative pressure is formed inside the recovery device 22 under the action of the negative pressure air source device. Cooling water, powder and air are sucked through the mixed flow channels 4 for separation and recovery, such that the pollution formed on a machining site is reduced, and the amount of cooling water is reduced, which not only saves water consumption, but also greatly reduces the cost of sewage treatment.

In the above embodiment, the diamond special-shaped grinding wheel 2 may be replaced with a polishing wheel for polishing.

Embodiment 3

As shown in FIGS. 5 to 8, a vertical machining cooling system comprises a rotary main shaft 1 and a diamond special-shaped grinding wheel 2. The diamond special-shaped grinding wheel 2 sleeves the lower part of the rotary main shaft 1. A first accessory 3 having a circular ring shape is arranged at the upper end of the diamond special-shaped grinding wheel 2. The annular groove 204 in the diamond special-shaped grinding wheel 2 is communicated with a negative pressure channel 5 in the first accessory 3. Cooling water is input to the upper side and/or the lower side of the grinding opening of the diamond special-shaped grinding wheel 2. The grinding opening 2 of the diamond special-shaped grinding wheel 2 refers to a grinding opening of the grinding ring 203. A negative pressure is formed inside the negative pressure channel 5. Cooling water, powder and air are sucked through the mixed flow channels 4.

In the above embodiment, an annular first cooling water conveying device 9 surrounding the grinding opening is fixedly arranged at the grinding opening of the diamond special-shaped grinding wheel 2. A water outlet of the annular first cooling water conveying device 9 is positioned above the grinding opening of the diamond special-shaped grinding wheel 2, and faces the grinding opening of the diamond special-shaped grinding wheel 2. A third accessory 25 having a circular ring shape is arranged at the lower end of the diamond special-shaped grinding wheel 2. The third accessory 25 wraps the lower part of the diamond special-shaped grinding wheel 2. A second lower water flow channel 10 is arranged between the third accessory 25 and the lower end surface of the diamond special-shaped grinding wheel 2. One end of the second lower water flow channel 10 extends upward to the grinding opening of the diamond special-shaped grinding wheel 2, and the other end of the second lower water flow channel 10 is communicated with the first cooling water channel 11 in the rotary main shaft 1. A kidney-shaped groove is formed at a position, corresponding to the negative pressure channel 5, of the first accessory 3.

During machining, the rotary main shaft 1 rotates to drive the diamond special-shaped grinding wheel 2 to rotate to grind a glass workpiece 23. A cooling water source in the rotary main shaft 1 outputs cooling water to the second lower water flow channel 10 via the first cooling water channel 11. The annular first cooling water conveying device 9 and the second lower water flow channel 10 discharge cooling water respectively to the grinding opening of the diamond special-shaped grinding wheel 2 in up and down directions. A negative pressure is formed inside the negative pressure channel 5 under the action of the negative pressure air source. Cooling water output from the annular first cooling water conveying device 9 and the second lower water flow channel 10 forms a coating water film on the working face of the diamond special-shaped grinding wheel 2, such that the cooling effect is improved. The water outlet of the annular first cooling water conveying device 9 does not rotate with the diamond special-shaped grinding wheel 2, such that the cooling water is less affected by the centrifugal action of the diamond special-shaped grinding wheel 2, and the usage amount of the cooling water is reduced. The powder is mixed with the cooling water under the action of the negative pressure air source, and the mixture is then transported to the outside through the mixed flow channels 4 and the negative pressure channel 5 for recovery and separation. The rapid removal of the powder from the grinding surface not only reduces the frictional heat, but also ensures the protrusion height of diamond, such that the grinding capability of the grinding wheel can be improved to adapt to efficient machining. Meanwhile, the pollution formed on a machining site is reduced. In addition, the amount of cooling water is reduced, which not only saves water consumption, but also greatly reduces the cost of sewage treatment.

During machining, the rotary main shaft 1 rotates at a high speed to drive the diamond special-shaped grinding wheel 2 to rotate at a high speed to grind the glass workpiece 23. Cooling water mist in the rotary main shaft 1 is output to the second lower water flow channel 10 via the first cooling water channel 11. The annular first cooling water conveying device 9 and the second lower water flow channel 10 discharge cooling water mist respectively to the grinding opening of the diamond special-shaped grinding wheel 2 in up and down directions. A negative pressure is formed inside the negative pressure channel 5 under the action of the negative pressure air source. Cooling water mist output from the annular first cooling water conveying device 9 and the second lower water flow channel 10 forms a coating water film on the working face of the diamond special-shaped grinding wheel 2, such that the cooling effect is improved. The water outlet of the annular first cooling water conveying device 9 does not rotate with the diamond special-shaped grinding wheel 2 at a high speed, such that the cooling water mist is less affected by the centrifugal action of the diamond special-shaped grinding wheel 2, and the usage amount of the cooling water mist is reduced.

In the above embodiment, the vertical machining cooling system further comprises a recovery device 22 for recovering cooling water and powder, and a negative pressure air source device. The recovery device 22 is communicated with the negative pressure channel 5. The negative pressure air source device is communicated with the recovery device 22 via a pipeline.

A negative pressure is formed inside the recovery device 22 under the action of the negative pressure air source device. Cooling water, powder and air are sucked through the mixed flow channels 4 for separation and recovery, such that the pollution formed on a machining site is reduced, and the amount of cooling water is reduced, which not only saves water consumption, but also greatly reduces the cost of sewage treatment.

In the above embodiment, the diamond special-shaped grinding wheel 2 may be replaced with a polishing wheel for polishing.

Embodiment 4

Figure 1:
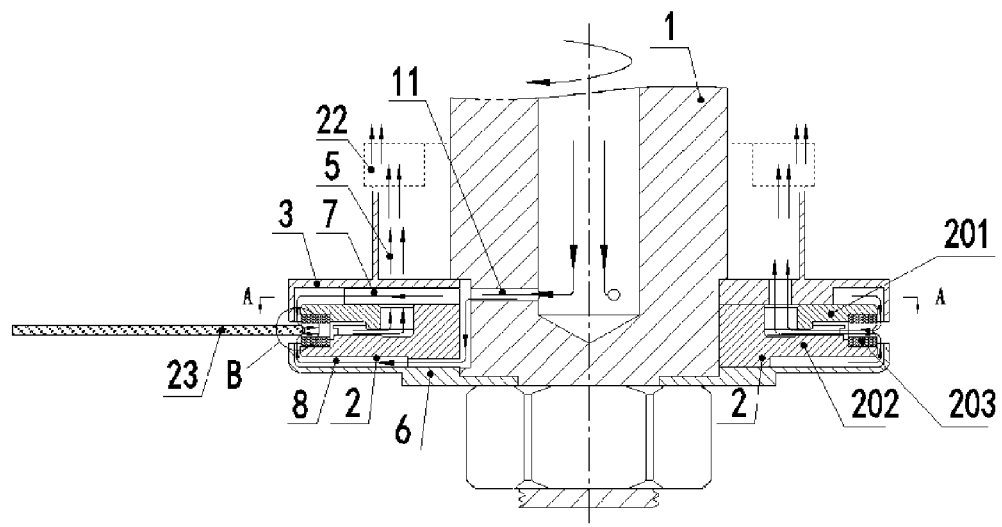
FIG. 1 is a schematic view of a diagram showing a structural principle of a vertical machining cooling system according to Embodiment 2 of the present invention.
Figure 2:
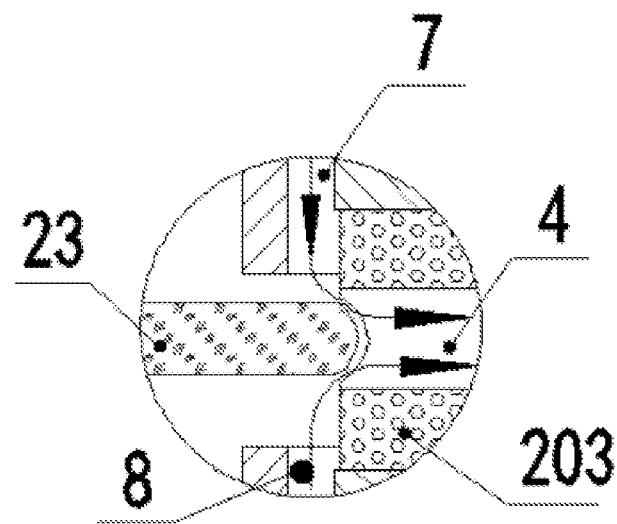
FIG. 2 is a locally enlarged schematic view of a part B in FIG. 1.
Figure 3:
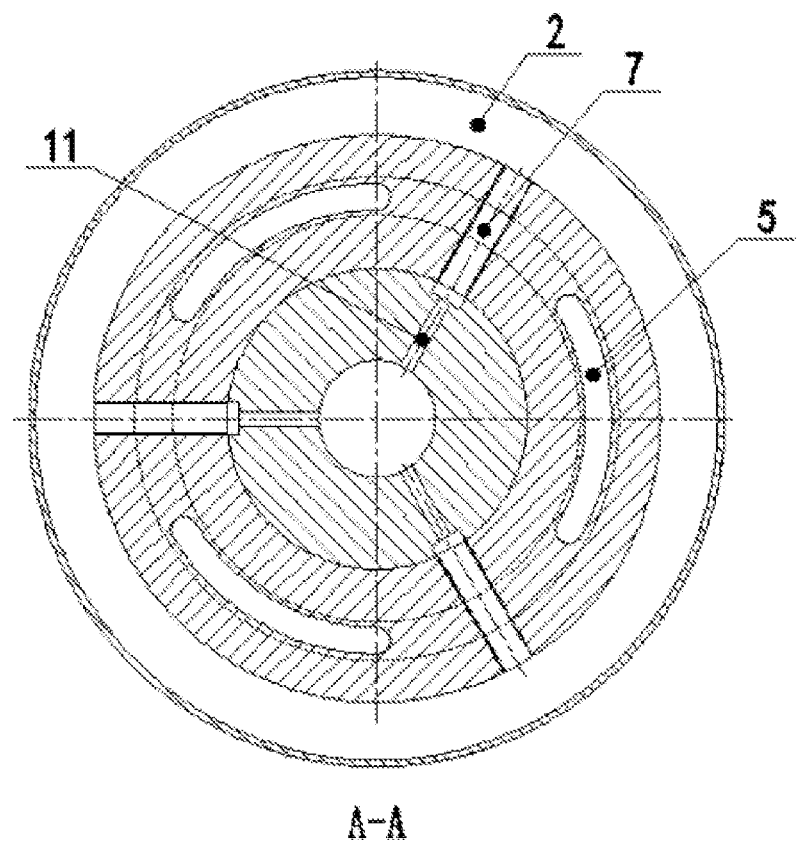
FIG. 3 is a sectional view of FIG. 1 across line A-A.
Figure 4:
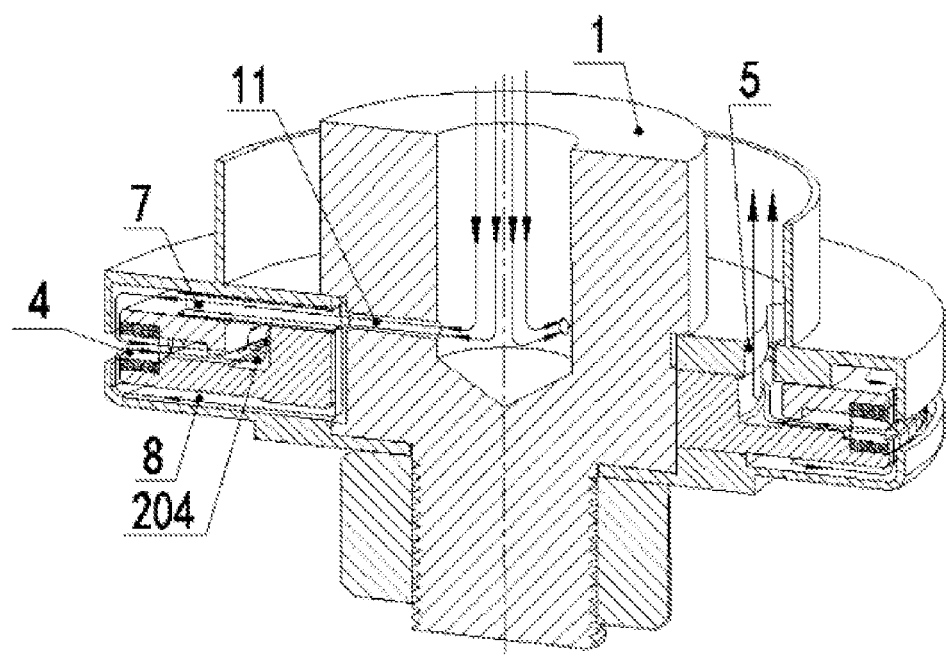
FIG. 4 is a perspective schematic view of a vertical machining cooling system according to Embodiment 2 of the present invention.
Figure 5:
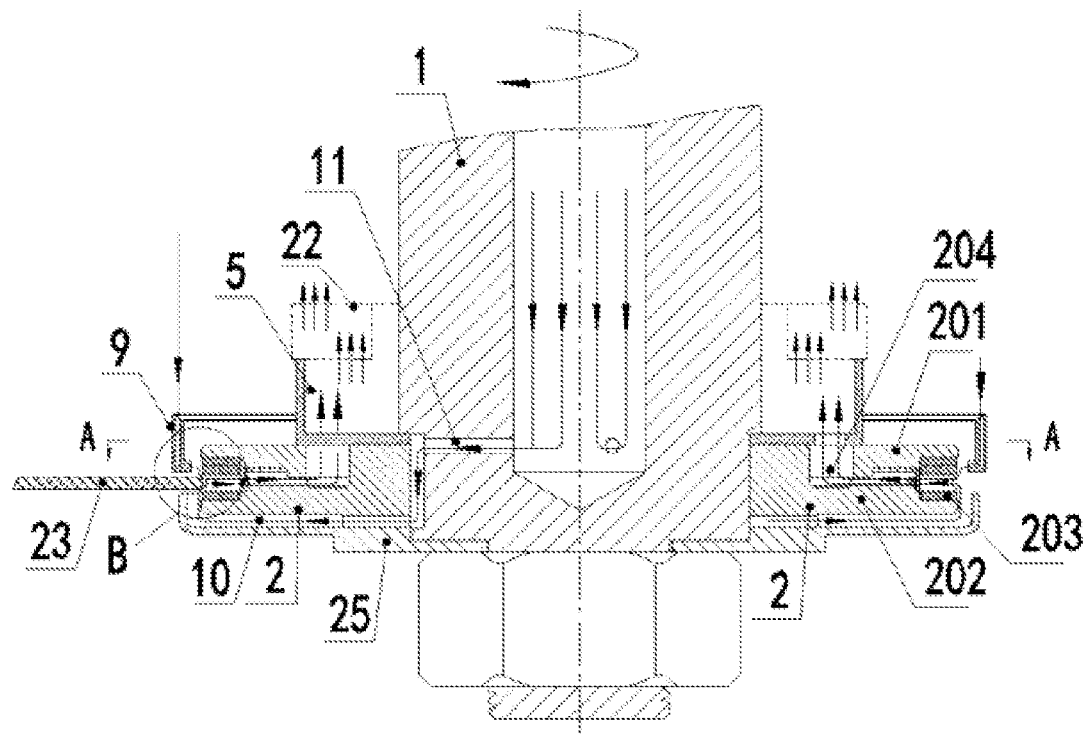
FIG. 5 is a schematic view of a diagram showing a structural principle of a vertical machining cooling system according to Embodiment 3 of the present invention.
Figure 6:
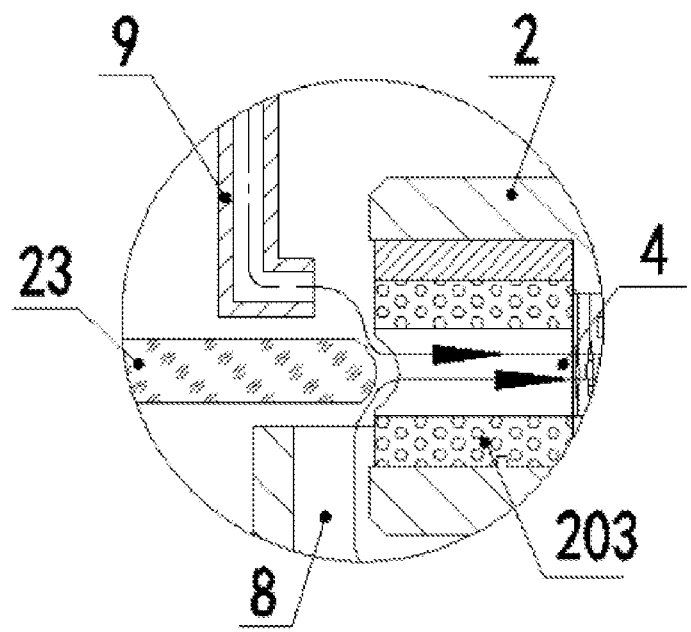
FIG. 6 is a locally enlarged schematic view of a part B in FIG. 5.
Figure 7:
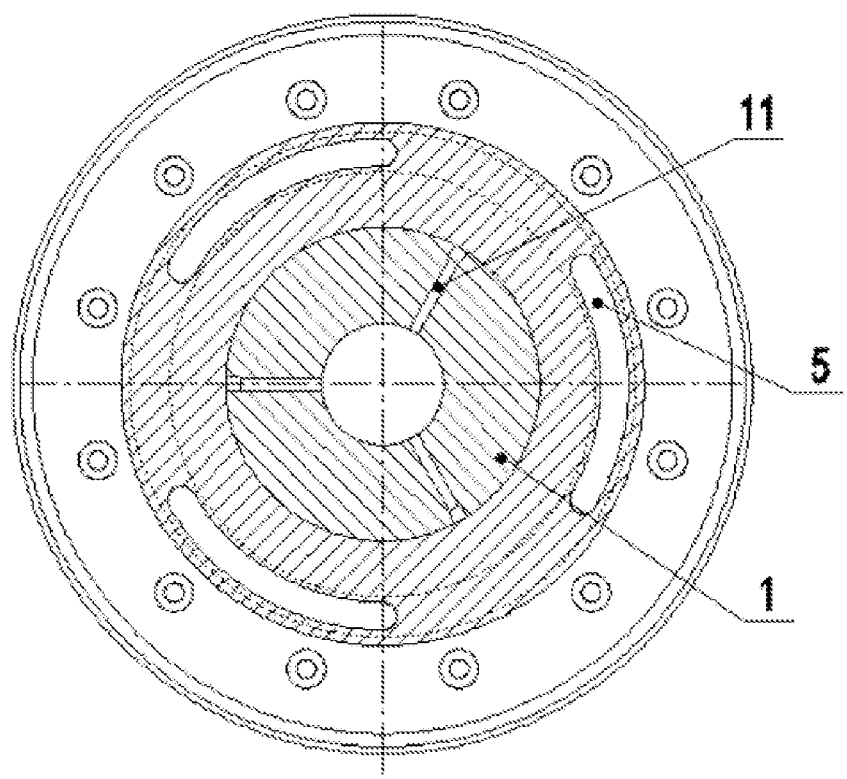
FIG. 7 is a sectional view of FIG. 5 across line A-A.
Figure 8:
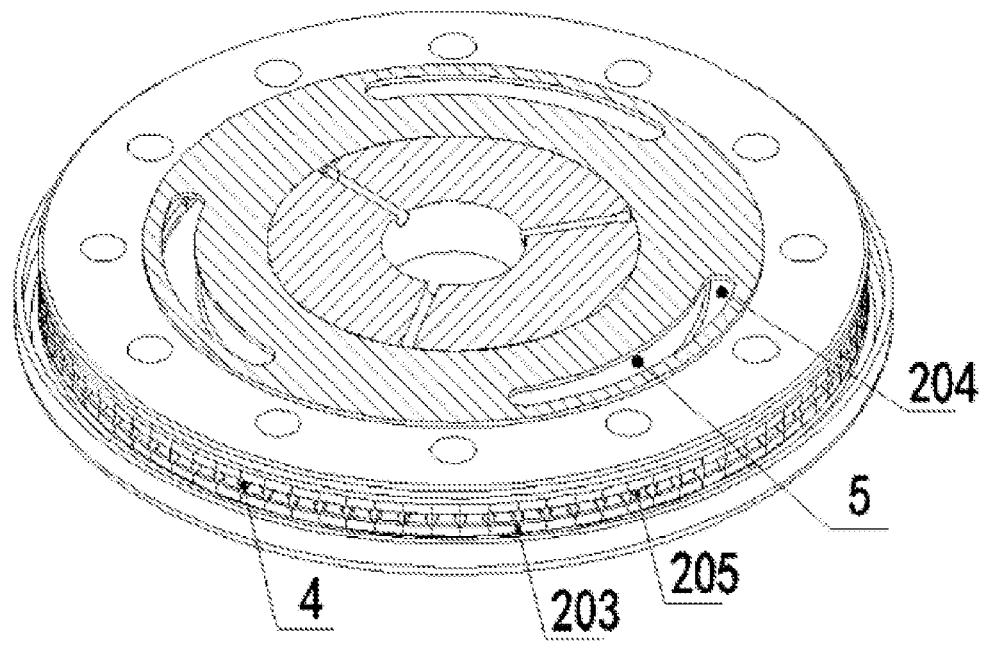
FIG. 8 is a perspective schematic view of an AA sectional view of FIG. 5.
Figure 9:
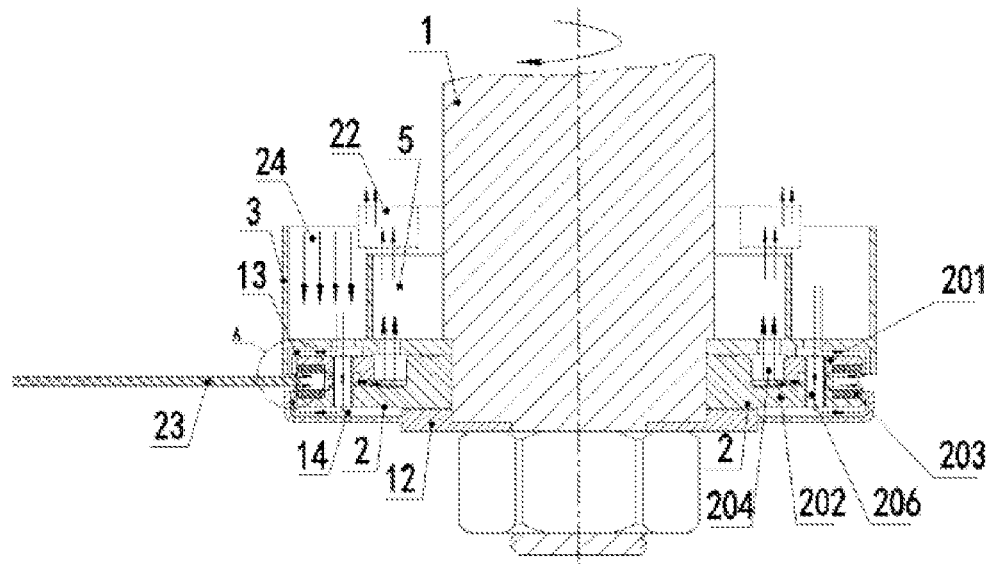
FIG. 9 is a schematic view of a diagram showing a structural principle of a vertical machining cooling system according to Embodiment 4 of the present invention.
Figure 10:
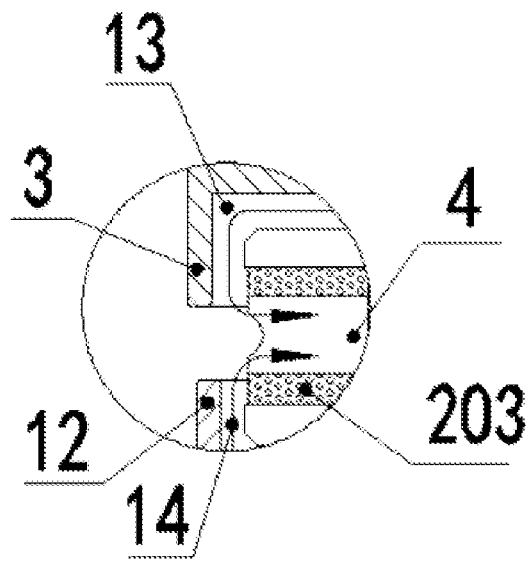
FIG. 10 is a locally enlarged schematic view of a part A in FIG. 9.
Figure 11:
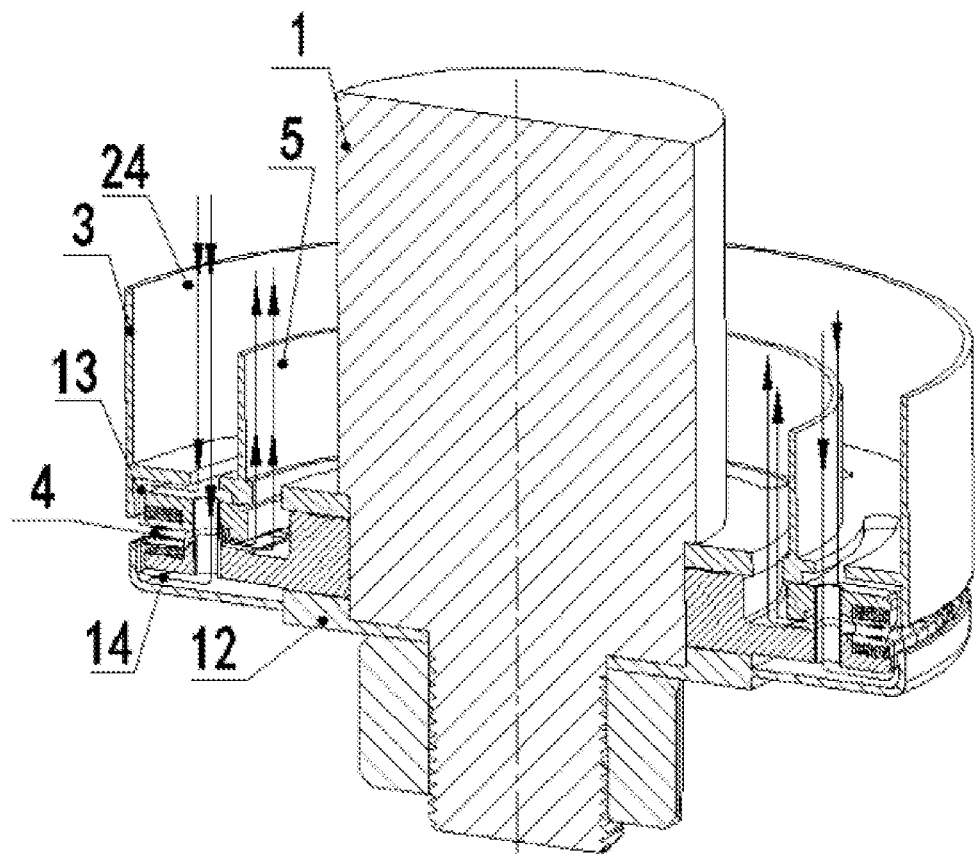
FIG. 11 is a perspective schematic view of a vertical machining cooling system according to Embodiment 4 of the present invention.

As shown in FIGS. 9 to 11, a vertical machining cooling system comprises a rotary main shaft 1 and a diamond special-shaped grinding wheel 2. The diamond special-shaped grinding wheel 2 sleeves the lower part of the rotary main shaft 1. A first accessory 3 having a circular ring shape is arranged at the upper end of the diamond special-shaped grinding wheel 2. An annular groove 204 in the diamond special-shaped grinding wheel 2 is communicated with a negative pressure channel 5 in the first accessory 3. Cooling water is input to the upper side and/or the lower side of the grinding opening of the diamond special-shaped grinding wheel 2. The grinding opening 2 of the diamond special-shaped grinding wheel 2 refers to a grinding opening of the grinding ring 203. A negative pressure is formed inside the negative pressure channel 5. Cooling water, powder and air are sucked through the mixed flow channels 4.

In the above embodiment, the first accessory 3 wraps the upper part of the diamond special-shaped grinding wheel 2. A fourth accessory 12 having a circular ring shape is arranged at the lower end of the diamond special-shaped grinding wheel 2. The fourth accessory 12 wraps the lower part of the diamond special-shaped grinding wheel 2. An annular opening is formed in a position, corresponding to the grinding opening of the diamond special-shaped grinding wheel 2, of the first accessory 3 and the fourth accessory 12, respectively. A second upper water flow channel 13 is arranged between the first accessory 3 and the upper end surface of the diamond special-shaped grinding wheel 2. One end of the second upper water flow channel 13 is communicated with a second cooling water channel 24 in the first accessory 3, and the other end of the second upper water flow channel 13 extends downward to the grinding opening of the diamond special-shaped grinding wheel 2. A third lower water flow channel 14 is arranged between the fourth accessory 12 and the lower end surface of the diamond special-shaped grinding wheel 2. One end of the third lower water flow channel 14 extends upward to the grinding opening of the diamond special-shaped grinding wheel 2, and the other end of the third lower water flow channel 14 is communicated with the second cooling water channel 24 in the first accessory 3 via the water inlet channel 206. A kidney-shaped groove is formed at a position, corresponding to the negative pressure channel 5, of the first accessory 3.

During machining, the rotary main shaft 1 rotates to drive the diamond special-shaped grinding wheel 2 to rotate to grind a glass workpiece 23. A cooling water source in the first accessory 3 outputs cooling water to the second upper water flow channel 13 and the third lower water flow channel 14 via the second cooling water channel 24. The second upper water flow channel 13 and the third lower water flow channel 14 discharge cooling water respectively to the grinding opening of the diamond special-shaped grinding wheel 2 in up and down directions. A negative pressure is formed inside the negative pressure channel 5 under the action of the negative pressure air source. Cooling water output from the second upper water flow channel 13 and the third lower water flow channel 14 forms a coating water film on the working face of the diamond special-shaped grinding wheel 2, such that the cooling effect is improved, and the usage amount of the cooling water is reduced. The powder is mixed with the cooling water under the action of the negative pressure air source, and the mixture is then transported to the outside through the mixed flow channels 4 and the negative pressure channel 5 for recovery and separation. The rapid removal of the powder from the grinding surface not only reduces the frictional heat, but also ensures the protrusion height of diamond, such that the grinding capability of the grinding wheel can be improved to adapt to efficient machining. Meanwhile, the pollution formed on a machining site is reduced. In addition, the amount of cooling water is reduced, which not only saves water consumption, but also greatly reduces the cost of sewage treatment.

During machining, the rotary main shaft 1 rotates at a high speed to drive the diamond special-shaped grinding wheel 2 to rotate at a high speed to grind the glass workpiece 23. Cooling water mist in the first accessory 3 is output to the second upper water flow channel 13 and the third lower water flow channel 14 via the second cooling water channel 24. The second upper water flow channel 13 and the third lower water flow channel 14 discharge cooling water mist respectively to the grinding opening of the diamond special-shaped grinding wheel 2 in up and down directions. A negative pressure is formed inside the negative pressure channel 5 under the action of the negative pressure air source. Cooling water mist output from the second upper water flow channel 13 and the third lower water flow channel 14 forms a coating water film on the working face of the diamond special-shaped grinding wheel 2, such that the cooling effect is improved, and the usage amount of the cooling water mist is reduced.

In the above embodiment, the vertical machining cooling system further comprises a recovery device 22 for recovering cooling water and powder, and a negative pressure air source device. The recovery device 22 is communicated with the negative pressure channel 5. The negative pressure air source device is communicated with the recovery device 22 via a pipeline.

A negative pressure is formed inside the recovery device 22 under the action of the negative pressure air source device. Cooling water, powder and air are sucked through the mixed flow channels 4 for separation and recovery, such that the pollution formed on a machining site is reduced, and the amount of cooling water is reduced, which not only saves water consumption, but also greatly reduces the cost of sewage treatment.

In the above embodiment, the diamond special-shaped grinding wheel 2 may be replaced with a polishing wheel for polishing.

Embodiment 5

Figure 12:
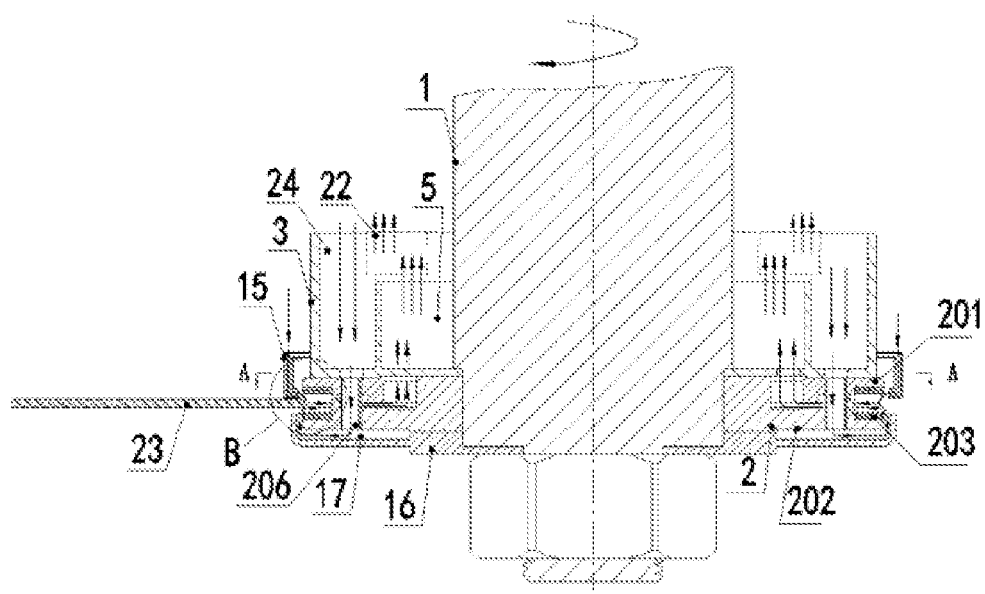
FIG. 12 is a schematic view of a diagram showing a structural principle of a vertical machining cooling system according to Embodiment 5 of the present invention.
Figure 13:
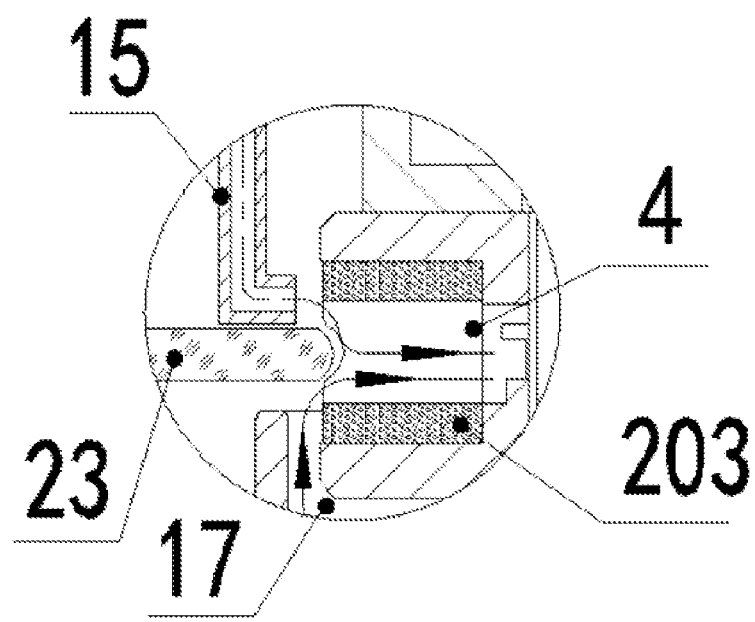
FIG. 13 is a locally enlarged schematic view of a part B in FIG. 12.
Figure 14:
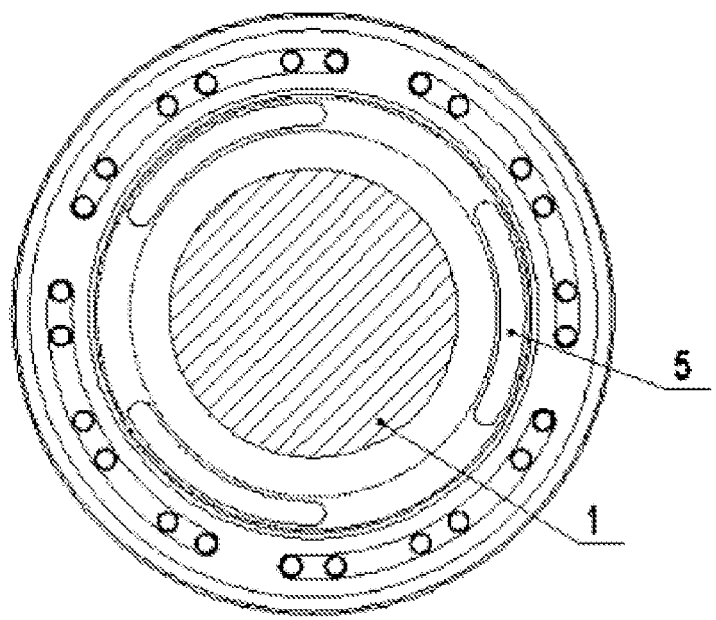
FIG. 14 is a sectional view of FIG. 12 across line A-A.

As shown in FIGS. 12 to 14, a vertical machining cooling system comprises a rotary main shaft 1 and a diamond special-shaped grinding wheel 2. The diamond special-shaped grinding wheel 2 sleeves the lower part of the rotary main shaft 1. A first accessory 3 having a circular ring shape is arranged at the upper end of the diamond special-shaped grinding wheel 2. An annular groove 204 in the diamond special-shaped grinding wheel 2 is communicated with a negative pressure channel 5 in the first accessory 3. Cooling water is input to the upper side and/or the lower side of the grinding opening of the diamond special-shaped grinding wheel 2. The grinding opening of the diamond special-shaped grinding wheel 2 refers to a grinding opening of the grinding ring 203. A negative pressure is formed inside the negative pressure channel 5. Cooling water, powder and air are sucked through the mixed flow channels 4.

In the above embodiment, an annular second cooling water conveying device 15 surrounding the grinding opening is fixedly arranged at the grinding opening of the diamond special-shaped grinding wheel 2. A water outlet of the annular second cooling water conveying device 15 is positioned above the grinding opening of the diamond special-shaped grinding wheel 2, and faces the grinding opening of the diamond special-shaped grinding wheel 2. A fifth accessory 16 having a circular ring shape is arranged at the lower end of the diamond special-shaped grinding wheel 2. The fifth accessory 16 wraps the lower part of the diamond special-shaped grinding wheel 2. A fourth lower water flow channel 17 is arranged between the fifth accessory 16 and the lower end surface of the diamond special-shaped grinding wheel 2. One end of the fourth lower water flow channel 17 extends upward to the grinding opening of the diamond special-shaped grinding wheel 2, and the other end of the fourth lower water flow channel 17 is communicated with the second cooling water channel 24 in the first accessory 3 via the water inlet channel 206. The second cooling water channel 24 in the first accessory 3 is located at the outer side of the negative pressure channel 5. A kidney-shaped groove is formed at a position, corresponding to the negative pressure channel 5, of the first accessory 3.

During machining, the rotary main shaft 1 rotates to drive the diamond special-shaped grinding wheel 2 to rotate to grind a glass workpiece 23. A cooling water source in the first accessory 3 outputs cooling water to the fourth lower water flow channel 17 via the second cooling water channel 24. The annular second cooling water conveying device 15 and the fourth lower water flow channel 17 discharge cooling water respectively to the grinding opening of the diamond special-shaped grinding wheel 2 in up and down directions. A negative pressure is formed inside the negative pressure channel 5 under the action of the negative pressure air source. Cooling water output from the annular second cooling water conveying device 15 and the fourth lower water flow channel 17 forms a coating water film on the working face of the diamond special-shaped grinding wheel 2, such that the cooling effect is improved. The water outlet of the annular second cooling water conveying device 15 does not rotate with the diamond special-shaped grinding wheel 2, such that the cooling water is less affected by the centrifugal action of the diamond special-shaped grinding wheel 2, and the usage amount of the cooling water is reduced. The powder is mixed with the cooling water under the action of the negative pressure air source, and the mixture is then transported to the outside through the mixed flow channels 4 and the negative pressure channel 5 for recovery and separation. The rapid removal of the powder from the grinding surface not only reduces the frictional heat, but also ensures the protrusion height of diamond, such that the grinding capability of the grinding wheel can be improved to adapt to efficient machining. Meanwhile, the pollution formed on a machining site is reduced. In addition, the amount of cooling water is reduced, which not only saves water consumption, but also greatly reduces the cost of sewage treatment.

During machining, the rotary main shaft 1 rotates at a high speed to drive the diamond special-shaped grinding wheel 2 to rotate at a high speed to grind the glass workpiece 23. Cooling water mist in the first accessory 3 is output to the fourth lower water flow channel 17 via the second cooling water channel 24. The annular second cooling water conveying device 15 and the fourth lower water flow channel 17 discharge cooling water mist respectively to the grinding opening of the diamond special-shaped grinding wheel 2 in up and down directions. A negative pressure is formed inside the negative pressure channel 5 under the action of the negative pressure air source. Cooling water mist output from the annular second cooling water conveying device 15 and the fourth lower water flow channel 17 forms a coating water film on the working face of the diamond special-shaped grinding wheel 2, such that the cooling effect is improved. The water outlet of the annular second cooling water conveying device 15 does not rotate with the diamond special-shaped grinding wheel 2, such that the cooling water mist is less affected by the centrifugal action of the diamond special-shaped grinding wheel 2, and the usage amount of the cooling water mist is reduced.

In the above embodiment, the vertical machining cooling system further comprises a recovery device 22 for recovering cooling water and powder, and a negative pressure air source device. The recovery device 22 is communicated with the negative pressure channel 5. The negative pressure air source device is communicated with the recovery device 22 via a pipeline.

A negative pressure is formed inside the recovery device 22 under the action of the negative pressure air source device. Cooling water, powder and air are sucked through the mixed flow channels 4 for separation and recovery, such that the pollution formed on a machining site is reduced, and the amount of cooling water is reduced, which not only saves water consumption, but also greatly reduces the cost of sewage treatment.

In the above embodiment, the diamond special-shaped grinding wheel 2 may be replaced with a polishing wheel for polishing.

Embodiment 6

Figure 15:
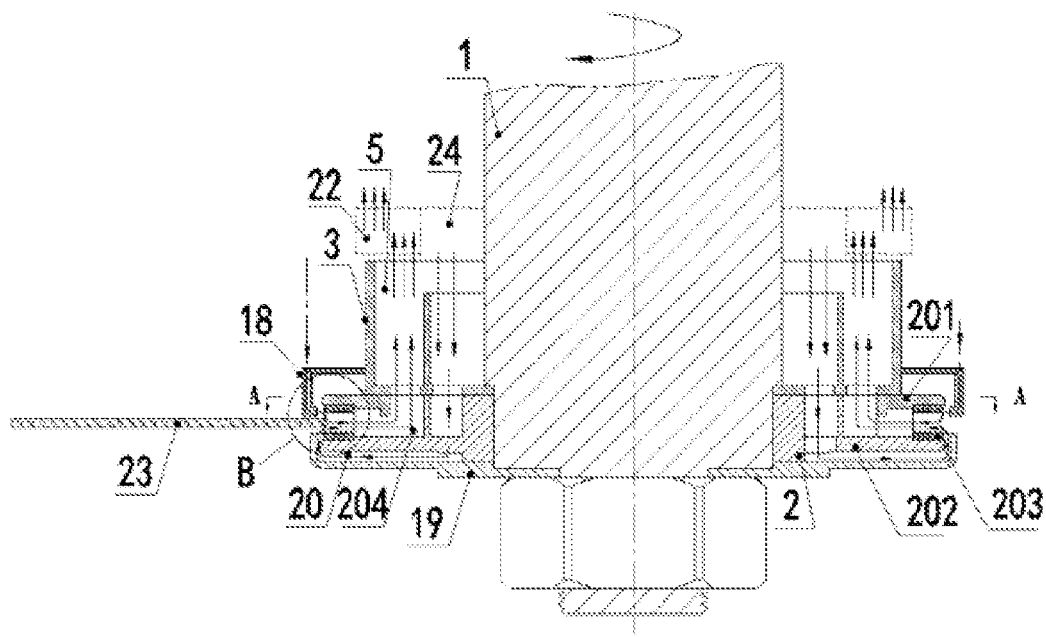
FIG. 15 is a schematic view of a diagram showing a structural principle of a vertical machining cooling system according to Embodiment 6 of the present invention.
Figure 16:
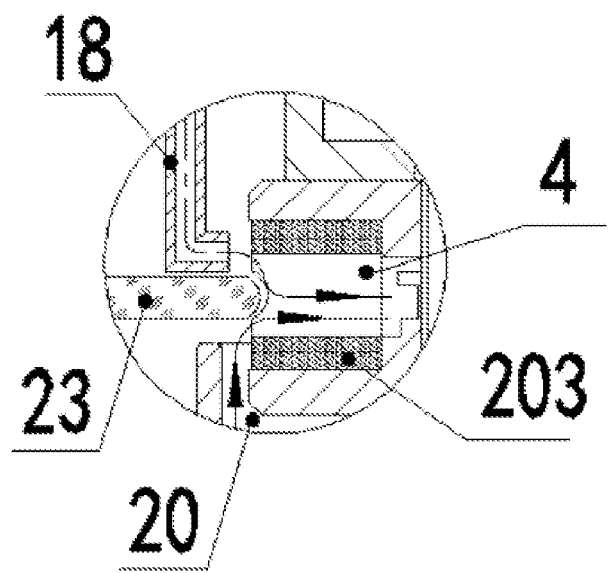
FIG. 16 is a locally enlarged schematic view of a part B in FIG. 15.
Figure 17:
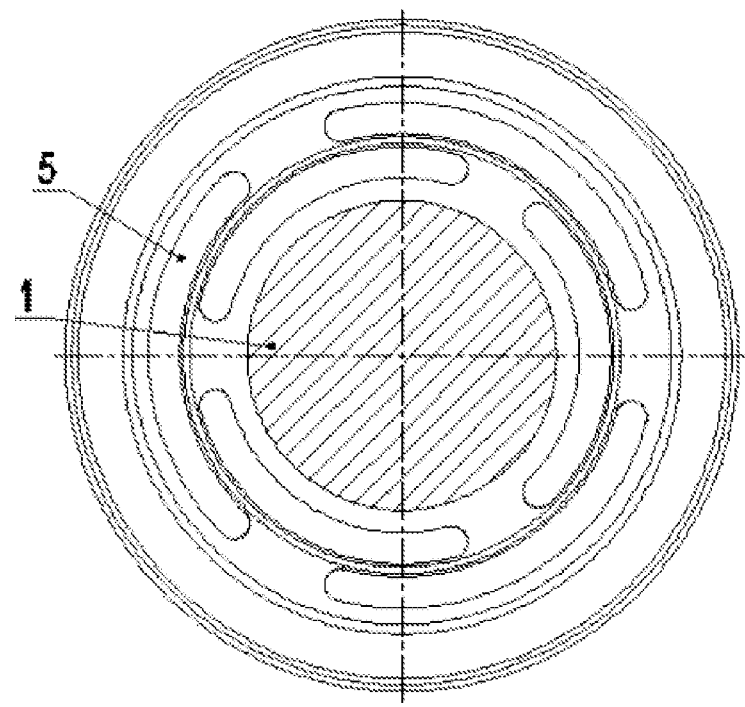
FIG. 17 is a sectional view of FIG. 15 across line A-A.

As shown in FIGS. 15 to 17, a vertical machining cooling system comprises a rotary main shaft 1 and a diamond special-shaped grinding wheel 2. The diamond special-shaped grinding wheel 2 sleeves the lower part of the rotary main shaft 1. A first accessory 3 having a circular ring shape is arranged at the upper end of the diamond special-shaped grinding wheel 2. An annular groove 204 in the diamond special-shaped grinding wheel 2 is communicated with a negative pressure channel 5 in the first accessory 3. Cooling water is input to the upper side and/or the lower side of the grinding opening of the diamond special-shaped grinding wheel 2. The grinding opening of the diamond special-shaped grinding wheel 2 refers to a grinding opening of the grinding ring 203. A negative pressure is formed inside the negative pressure channel 5. Cooling water, powder and air are sucked through the mixed flow channels 4.

In the above embodiment, an annular third cooling water conveying device 18 surrounding the grinding opening is fixedly arranged at the grinding opening of the diamond special-shaped grinding wheel 2. A water outlet of the annular third cooling water conveying device 18 is positioned above the grinding opening of the diamond special-shaped grinding wheel 2, and faces the grinding opening of the diamond special-shaped grinding wheel 2. A sixth accessory 19 having a circular ring shape is arranged at the lower end of the diamond special-shaped grinding wheel 2. The sixth accessory 19 wraps the lower part of the diamond special-shaped grinding wheel 2. A fifth lower water flow channel 20 is arranged between the sixth accessory 19 and the lower end surface of the diamond special-shaped grinding wheel 2. One end of the fifth lower water flow channel 20 extends upward to the grinding opening of the diamond special-shaped grinding wheel 2, and the other end of the fifth lower water flow channel 20 passes through the diamond special-shaped grinding wheel 2 upwards and is communicated with the second cooling water channel 24 in the first accessory 3. The second cooling water channel 24 in the first accessory 3 is positioned at the inner side of the negative pressure channel 5. The diamond special-shaped grinding wheel 2 is internally provided with two annular grooves 204. One annular groove 204 is communicated with the plurality of mixed flow channels 4 and the negative pressure channel 5. The other annular groove 204 is communicated with the second cooling water channel 24 and the fifth lower water flow channel 20. A kidney-shaped groove is formed at a position, corresponding to the negative pressure channel 5, of the first accessory 3.

During machining, the rotary main shaft 1 rotates to drive the diamond special-shaped grinding wheel 2 to rotate to grind a glass workpiece 23. A cooling water source in the first accessory 3 outputs cooling water to the fifth lower water flow channel 20 via the second cooling water channel 24. The annular third cooling water conveying device 18 and the fifth lower water flow channel 20 discharge cooling water respectively to the grinding opening of the diamond special-shaped grinding wheel 2 in up and down directions. A negative pressure is formed inside the negative pressure channel 5 under the action of the negative pressure air source. Cooling water output from the annular third cooling water conveying device 18 and the fifth lower water flow channel 20 forms a coating water film on the working face of the diamond special-shaped grinding wheel 2, such that the cooling effect is improved. The water outlet of the annular third cooling water conveying device 18 does not rotate with the diamond special-shaped grinding wheel 2, such that the cooling water is less affected by the centrifugal action of the diamond special-shaped grinding wheel 2, and the usage amount of the cooling water is reduced. The powder is mixed with the cooling water under the action of the negative pressure air source, and the mixture is then transported to the outside through the mixed flow channels 4 and the negative pressure channel 5 for recovery and separation. The rapid removal of the powder from the grinding surface not only reduces the frictional heat, but also ensures the protrusion height of diamond, such that the grinding capability of the grinding wheel can be improved to adapt to efficient machining. Meanwhile, the pollution formed on a machining site is reduced. In addition, the amount of cooling water is reduced, which not only saves water consumption, but also greatly reduces the cost of sewage treatment.

During machining, the rotary main shaft 1 rotates at a high speed to drive the diamond special-shaped grinding wheel 2 to rotate at a high speed to grind the glass workpiece 23. Cooling water mist in the first accessory 3 is output to the fifth lower water flow channel 20 via the second cooling water channel 24. The annular third cooling water conveying device 18 and the fifth lower water flow channel 20 discharge cooling water mist respectively to the grinding opening of the diamond special-shaped grinding wheel 2 in up and down directions. A negative pressure is formed inside the negative pressure channel 5 under the action of the negative pressure air source. Cooling water mist output from the annular third cooling water conveying device 18 and the fifth lower water flow channel 20 forms a coating water film on the working face of the diamond special-shaped grinding wheel 2, such that the cooling effect is improved. The water outlet of the annular third cooling water conveying device 18 does not rotate with the diamond special-shaped grinding wheel 2, such that the cooling water mist is less affected by the centrifugal action of the diamond special-shaped grinding wheel 2, and the usage amount of the cooling water mist is reduced.

In the above embodiment, the vertical machining cooling system further comprises a recovery device 22 for recovering cooling water and powder, and a negative pressure air source device. The recovery device 22 is communicated with the negative pressure channel 5. The negative pressure air source device is communicated with the recovery device 22 via a pipeline.

A negative pressure is formed inside the recovery device 22 under the action of the negative pressure air source device. Cooling water, powder and air are sucked through the mixed flow channels 4 for separation and recovery, such that the pollution formed on a machining site is reduced, and the amount of cooling water is reduced, which not only saves water consumption, but also greatly reduces the cost of sewage treatment.

In the above embodiment, the diamond special-shaped grinding wheel 2 may be replaced with a polishing wheel for polishing.

Embodiment 7

Figure 18:
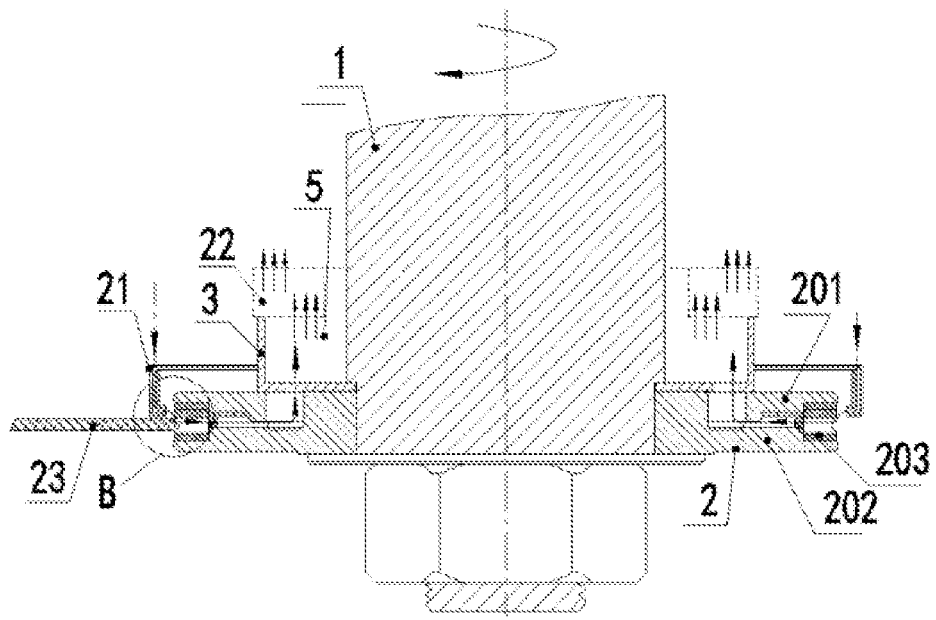
FIG. 18 is a schematic view of a diagram showing a structural principle of a vertical machining cooling system according to Embodiment 7 of the present invention.
Figure 19:
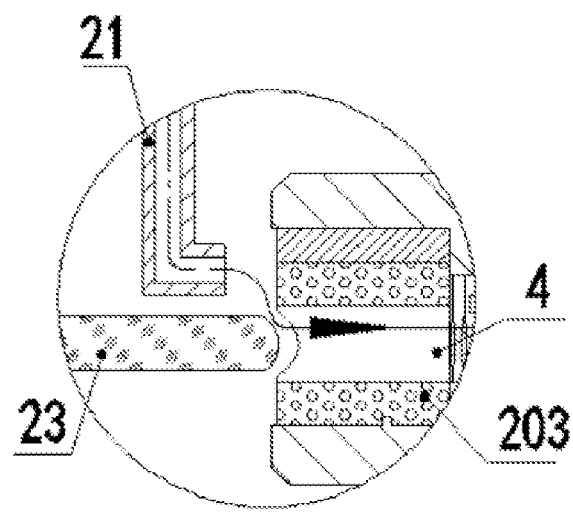
FIG. 19 is a locally enlarged schematic view of a part B in FIG. 18.
Figure 20:
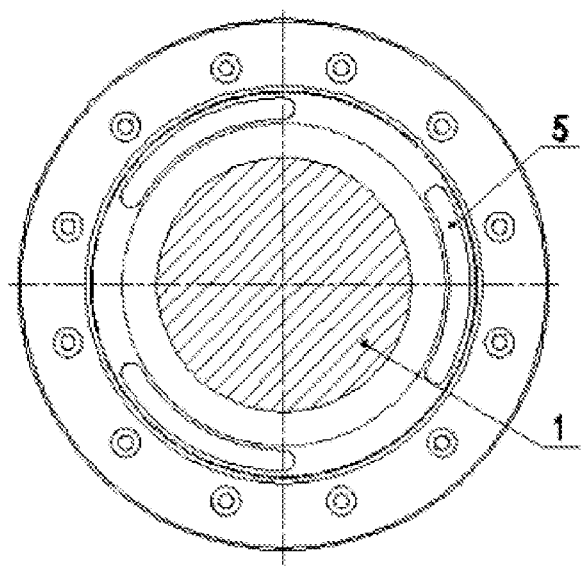
FIG. 20 is a sectional view of FIG. 18 across line A-A.

As shown in FIGS. 18 to 20, a vertical machining cooling system comprises a rotary main shaft 1 and a diamond special-shaped grinding wheel 2. The diamond special-shaped grinding wheel 2 sleeves the lower part of the rotary main shaft 1. A first accessory 3 having a circular ring shape is arranged at the upper end of the diamond special-shaped grinding wheel 2. An annular groove 204 in the diamond special-shaped grinding wheel 2 is communicated with a negative pressure channel 5 in the first accessory 3. Cooling water is input to the upper side and/or the lower side of the grinding opening of the diamond special-shaped grinding wheel 2. The grinding opening of the diamond special-shaped grinding wheel 2 refers to a grinding opening of the grinding ring 203. A negative pressure is formed inside the negative pressure channel 5. Cooling water, powder and air are sucked through the mixed flow channels 4.

In the above embodiment, an annular fourth cooling water conveying device 21 surrounding the grinding opening is fixedly arranged at the grinding opening of the diamond special-shaped grinding wheel 2. A water outlet of the annular fourth cooling water conveying device 21 is positioned above the grinding opening of the diamond special-shaped grinding wheel 2, and faces the grinding opening of the diamond special-shaped grinding wheel 2. A kidney-shaped groove is formed at a position, corresponding to the negative pressure channel 5, of the first accessory 3.

During machining, the rotary main shaft 1 rotates to drive the diamond special-shaped grinding wheel 2 to rotate to grind a glass workpiece 23. The annular fourth cooling water conveying device 21 discharges cooling water to the grinding opening of the diamond special-shaped grinding wheel 2. A negative pressure is formed inside the negative pressure channel 5 under the action of the negative pressure air source. Cooling water output from the annular fourth cooling water conveying device 21 forms a coating water film on the working face of the diamond special-shaped grinding wheel 2, such that the cooling effect is improved. The water outlet of the annular fourth cooling water conveying device 21 does not rotate with the diamond special-shaped grinding wheel 2, such that the cooling water is less affected by the centrifugal action of the diamond special-shaped grinding wheel 2, and the usage amount of the cooling water is reduced. The powder is mixed with the cooling water under the action of the negative pressure air source, and the mixture is then transported to the outside through the mixed flow channels 4 and the negative pressure channel 5 for recovery and separation. The rapid removal of the powder from the grinding surface not only reduces the frictional heat, but also ensures the protrusion height of diamond, such that the grinding capability of the grinding wheel can be improved to adapt to efficient machining. Meanwhile, the pollution formed on a machining site is reduced. In addition, the amount of cooling water is reduced, which not only saves water consumption, but also greatly reduces the cost of sewage treatment.

During machining, the rotary main shaft 1 rotates at a high speed to drive the diamond special-shaped grinding wheel 2 to rotate at a high speed to grind the glass workpiece 23. The annular fourth cooling water conveying device 21 discharges cooling water mist to the grinding opening of the diamond special-shaped grinding wheel 2. A negative pressure is formed inside the negative pressure channel 5 under the action of the negative pressure air source. Cooling water mist output from the annular fourth cooling water conveying device 21 forms a coating water film on the working face of the diamond special-shaped grinding wheel 2, such that the cooling effect is improved. The water outlet of the annular fourth cooling water conveying device 21 does not rotate with the diamond special-shaped grinding wheel 2, such that the cooling water mist is less affected by the centrifugal action of the diamond special-shaped grinding wheel 2, and the usage amount of the cooling water mist is reduced.

A negative pressure is formed inside the recovery device 22 under the action of the negative pressure air source device. Cooling water, powder and air are sucked through the mixed flow channels 4 for separation and recovery, such that the pollution formed on a machining site is reduced, and the amount of cooling water mist is reduced, which not only saves water consumption, but also greatly reduces the cost of sewage treatment.

In the above embodiment, the diamond special-shaped grinding wheel 2 may be replaced with a polishing wheel for polishing.

The technical principle of the present invention can also be applied to a horizontal machining cooling system, such as a flat glass engraving machine.

The above contents are only the preferred embodiments of the present invention, and are not intended to limit the present invention. Any modifications, equivalent displacements, improvements and the like, which fall within the spirit and principle of the present invention, should be included in the protection scope of the present invention.

We claim:
1. A diamond special-shaped grinding wheel, comprising: an upper base body,
a lower base body, and
a grinding ring,
wherein the upper base body is arranged at an upper end of the lower base body, and the upper base body and the lower base body are fixedly connected to form a grinding wheel body;
wherein the grinding ring in an annular shape is fixed to an outer circular ring of the grinding wheel body;
wherein the grinding wheel body is internally provided with one or two annular grooves communicated with an upper end face of the grinding wheel body;
wherein a plurality of mixed flow channels through which cooling water, powder and air are sucked is formed in the grinding ring;
wherein one end of each of the mixed flow channels extends to an annular grinding opening of the grinding ring, and the other end of each of the mixed flow channels is communicated with one of the annular grooves; and
wherein the annular grooves are communicated with an external negative pressure air source device.

2. The diamond special-shaped grinding wheel according to claim 1, wherein the grinding ring is fixed to the outer circular ring of the grinding wheel body by once die-casting with a mold; or the grinding ring is formed by arranging a plurality of tooth blocks at intervals or by connecting a plurality of tooth blocks in sequence to form a circular ring structure, and is fixed to the outer circular ring of the grinding wheel body; and the mixed flow channel is formed between every two adjacent tooth blocks.

3. The diamond special-shaped grinding wheel according to claim 1, wherein the grinding wheel body is provided with a plurality of water inlet channels to which the cooling water is introduced and which penetrate through the upper end surface and a lower end surface of the grinding wheel body.

4. A vertical machining cooling system, comprising a rotary main shaft and the diamond special-shaped grinding wheel according to claim 1, wherein the diamond special-shaped grinding wheel sleeves a lower part of the rotary main shaft;
wherein a first accessory having a circular ring shape is arranged at an upper end of the diamond special-shaped grinding wheel;
wherein the annular groove in the diamond special-shaped grinding wheel is communicated with a negative pressure channel in the first accessory;
wherein cooling water is input to an upper side and/or a lower side of the grinding opening of the diamond special-shaped grinding wheel;
wherein a negative pressure is formed inside the negative pressure channel; and
wherein cooling water, powder and air are sucked through the mixed flow channels.

5. The vertical machining cooling system according to claim 4, wherein the first accessory wraps an upper part of the diamond special-shaped grinding wheel;
wherein a second accessory having a circular ring shape is arranged at a lower end of the diamond special-shaped grinding wheel;
wherein the second accessory wraps a lower part of the diamond special-shaped grinding wheel;
wherein an annular opening is formed in a position, corresponding to the grinding opening of the diamond special-shaped grinding wheel, of the first accessory and the second accessory, respectively;
wherein a first upper water flow channel is arranged between the first accessory and an upper end surface of the diamond special-shaped grinding wheel;
wherein one end of the first upper water flow channel is communicated with a first cooling water channel in the rotary main shaft, and the other end of the first upper water flow channel extends downward to the grinding opening of the diamond special-shaped grinding wheel;
wherein a first lower water flow channel is arranged between the second accessory and a lower end surface of the diamond special-shaped grinding wheel; and
wherein one end of the first lower water flow channel extends upward to the grinding opening of the diamond special-shaped grinding wheel, and the other end of the first lower water flow channel is communicated with the first cooling water channel in the rotary main shaft.

6. The vertical machining cooling system according to claim 4, wherein an annular first cooling water conveying device surrounding the grinding opening is fixedly arranged at the grinding opening of the diamond special-shaped grinding wheel;
wherein a water outlet of the annular first cooling water conveying device is positioned above the grinding opening of the diamond special-shaped grinding wheel, and faces the grinding opening of the diamond special-shaped grinding wheel;

wherein a third accessory having a circular ring shape is arranged at a lower end of the diamond special-shaped grinding wheel;

wherein the third accessory wraps a lower part of the diamond special-shaped grinding wheel;

wherein a second lower water flow channel is arranged between the third accessory and the lower end surface of the diamond special-shaped grinding wheel; and wherein one end of the second lower water flow channel extends upward to the grinding opening of the diamond special-shaped grinding wheel, and the other end of the second lower water flow channel is communicated with a first cooling water channel in the rotary main shaft.

7. The vertical machining cooling system according to claim 4, wherein the first accessory wraps an upper part of the diamond special-shaped grinding wheel;

wherein a fourth accessory having a circular ring shape is arranged at a lower end of the diamond special-shaped grinding wheel;

wherein the fourth accessory wraps a lower part of the diamond special-shaped grinding wheel;

wherein an annular opening is formed in a position, corresponding to the grinding opening of the diamond special-shaped grinding wheel, of the first accessory and the fourth accessory, respectively;

wherein a second upper water flow channel is arranged between the first accessory and an upper end surface of the diamond special-shaped grinding wheel;

wherein one end of the second upper water flow channel is communicated with a second cooling water channel in the first accessory, and the other end of the second upper water flow channel extends downward to the grinding opening of the diamond special-shaped grinding wheel;

wherein a third lower water flow channel is arranged between the fourth accessory and a lower end surface of the diamond special-shaped grinding wheel; and wherein one end of the third lower water flow channel extends upward to the grinding opening of the diamond special-shaped grinding wheel, and the other end of the third lower water flow channel is communicated with the second cooling water channel in the first accessory via the water inlet channel.

8. The vertical machining cooling system according to claim 4, wherein an annular second cooling water conveying device surrounding the grinding opening is fixedly arranged at the grinding opening of the diamond special-shaped grinding wheel;

wherein a water outlet of the annular second cooling water conveying device is positioned above the grinding opening of the diamond special-shaped grinding wheel, and faces the grinding opening of the diamond special-shaped grinding wheel;

wherein a fifth accessory having a circular ring shape is arranged at a lower end of the diamond special-shaped grinding wheel;

wherein the fifth accessory wraps a lower part of the diamond special-shaped grinding wheel;

wherein a fourth lower water flow channel is arranged between the fifth accessory and a lower end surface of the diamond special-shaped grinding wheel;

wherein one end of the fourth lower water flow channel extends upward to the grinding opening of the diamond special-shaped grinding wheel, and the other end of the fourth lower water flow channel is communicated with the second cooling water channel in the first accessory; and wherein the second cooling water channel in the first accessory is positioned at an outer side of the negative pressure channel.

9. The vertical machining cooling system according to claim 4, wherein an annular third cooling water conveying device surrounding the grinding opening is fixedly arranged at the grinding opening of the diamond special-shaped grinding wheel;

wherein a water outlet of the annular third cooling water conveying device is positioned above the grinding opening of the diamond special-shaped grinding wheel, and faces the grinding opening of the diamond special-shaped grinding wheel;

wherein a sixth accessory having a circular ring shape is arranged at a lower end of the diamond special-shaped grinding wheel;

wherein the sixth accessory wraps a lower part of the diamond special-shaped grinding wheel;

wherein a fifth lower water flow channel is arranged between the sixth accessory and a lower end surface of the diamond special-shaped grinding wheel;

wherein one end of the fifth lower water flow channel extends upward to the grinding opening of the diamond special-shaped grinding wheel, and the other end of the fifth lower water flow channel is communicated with the second cooling water channel in the first accessory; and wherein the second cooling water channel in the first accessory is positioned at an inner side of the negative pressure channel.

10. The vertical machining cooling system according to claim 4, wherein an annular fourth cooling water conveying device surrounding the grinding opening is fixedly arranged at the grinding opening of the diamond special-shaped grinding wheel; and wherein a water outlet of the annular fourth cooling water conveying device is positioned above the grinding opening of the diamond special-shaped grinding wheel, and faces the grinding opening of the diamond special-shaped grinding wheel.

11. The vertical machining cooling system according to claim 4, further comprising:

a recovery device for recovering cooling water and powder, and a negative pressure air source device, wherein the recovery device is communicated with the negative pressure channel; and the negative pressure air source device is communicated with the recovery device via a pipeline.

\* \* \* \* \*